Oct. 12, 1926.
R. STAR
SHIP'S LOG
Filed July 19, 1924    5 Sheets-Sheet 1
1,603,161
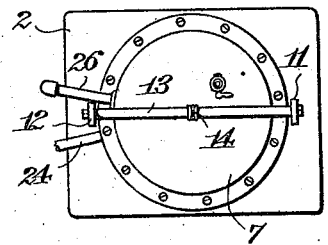
Fig. 2.
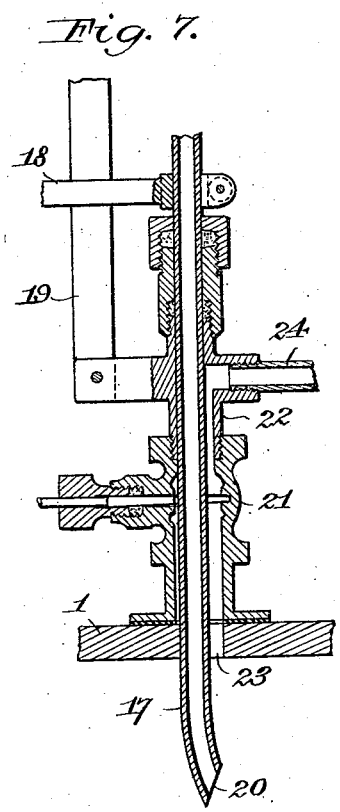
Fig. 7.
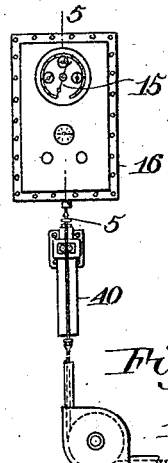
Fig. 1.
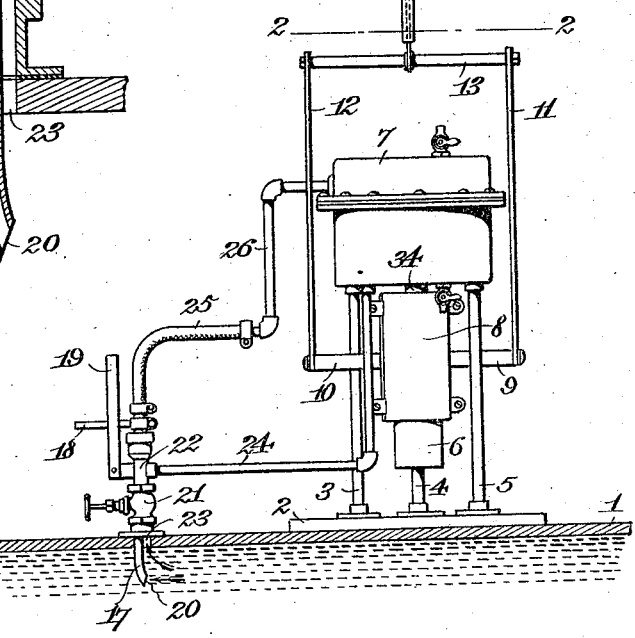
WITNESSES:
Cris Leinle.
A. L. Kitchin.
INVENTOR,
Richard Star.
BY
ATTORNEYS.

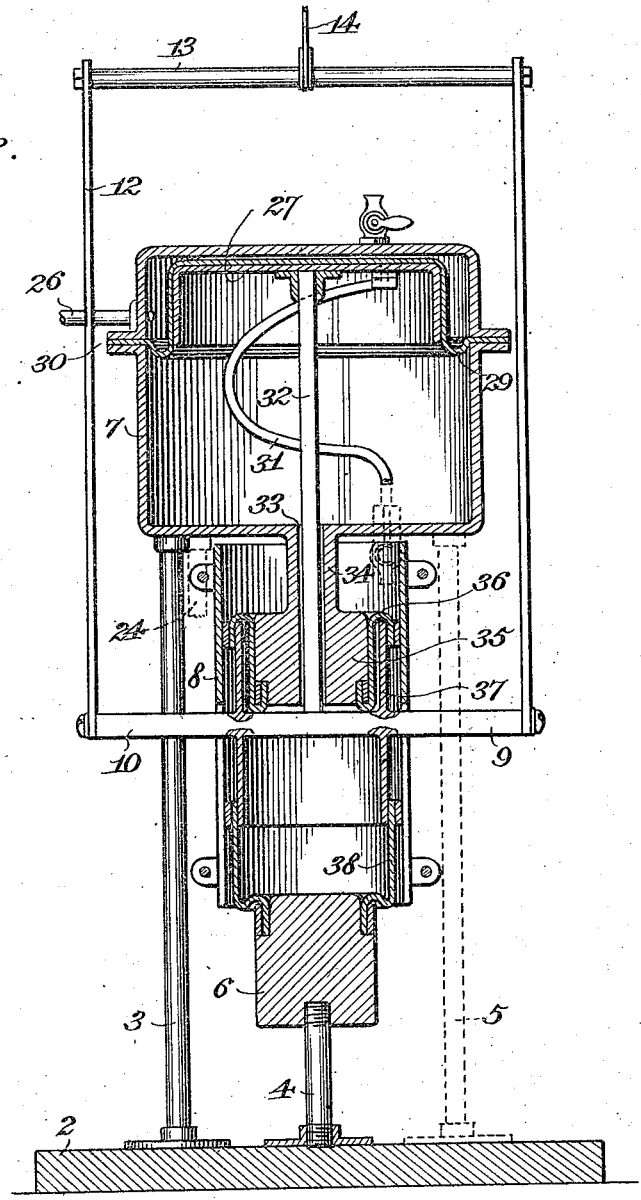

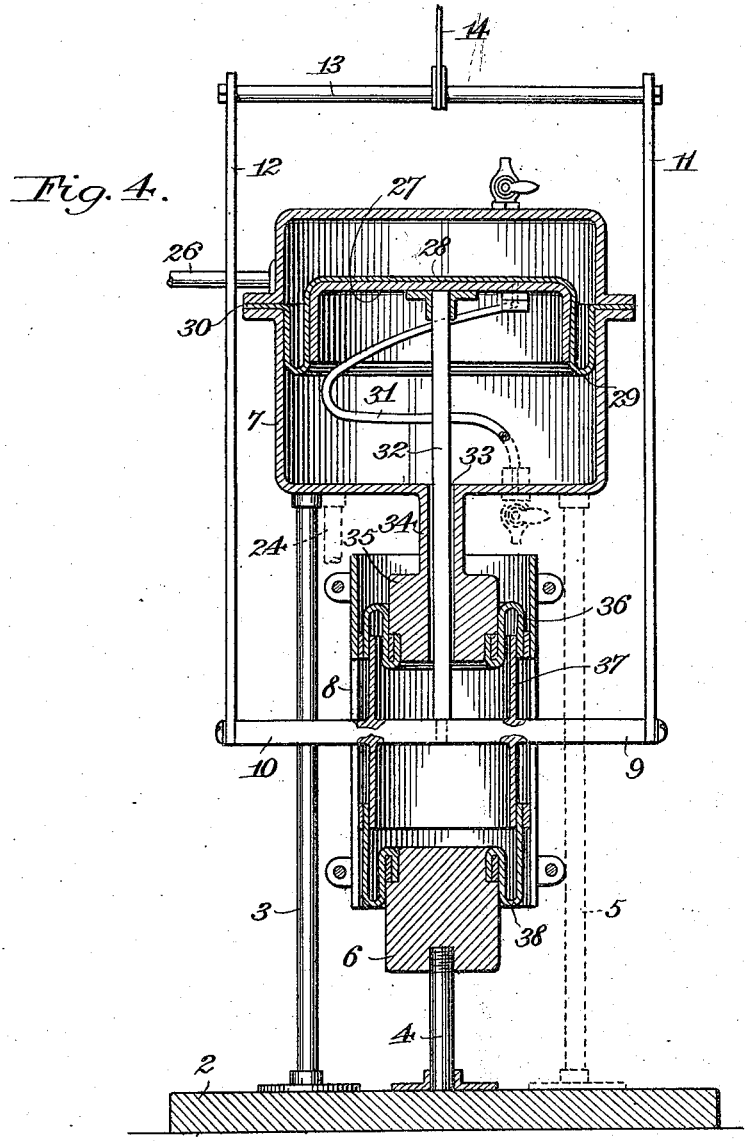

Oct. 12, 1926.

R. STAR

SHIP'S LOG

Filed July 19, 1924      5 Sheets-Sheet 4

1,603,161

WITNESSES:
Cris Peinle.
A. L. Kitchin

INVENTOR,
Richard Star.
BY
ATTORNEYS.

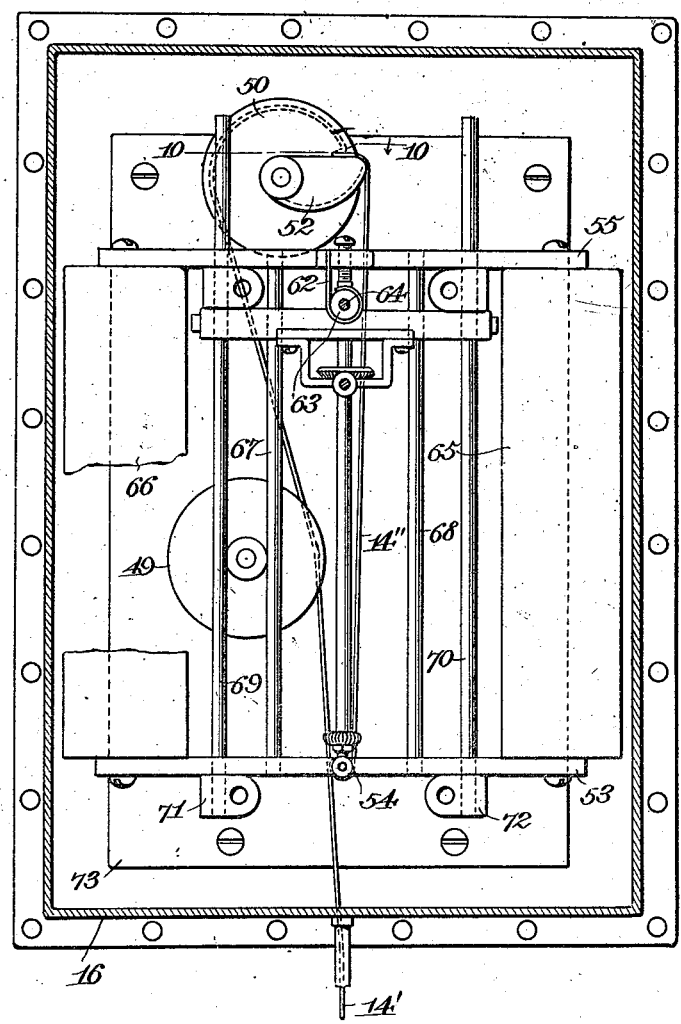

Patented Oct. 12, 1926.

1,603,161

UNITED STATES PATENT OFFICE.

RICHARD STAR, OF BROOKLYN, NEW YORK.

SHIP'S LOG.

Application filed July 19, 1924. Serial No. 727,011.

This invention relates to ships' logs and has for an object to provide an improved construction which may be mounted at any suitable place on a ship, as for instance, the bridge, and at all times give an accurate indication of the speed of the ship.

Another object of the invention is to provide a log which may be used by a sailing vessel, steam vessel or other vessel.

A still further object of the invention is to provide an improved ship's log which will function accurately on vessels of any type when moving evenly through the water or when listing.

An additional object is to provide a ship's log with indicating means and an actuator operated by the pressure of water passing through a Pitot tube in opposition to the pressure of water produced by the depth at which the actuator is positioned.

A further object is to provide a ship's log wherein there is provided a balancing element which will not set due to the length of time the log is in operation.

In the accompanying drawings—

Figure 1 is a schematic view partly in section, disclosing an embodiment of the invention as the same appears when in use.

Figure 2 is a fragmentary sectional view through Figure 1, approximately on line 2—2.

Figure 3 is an enlarged vertical sectional view through the actuator shown in Figure 1.

Figure 4 is a view similar to Figure 3 but showing the parts in a different position.

Figure 6 is a sectional view through Figure 5, approximately on line 6—6.

Figure 7 is a longitudinal vertical sectional view through the Pitot tube and associated parts shown in Figure 1.

Figure 8:
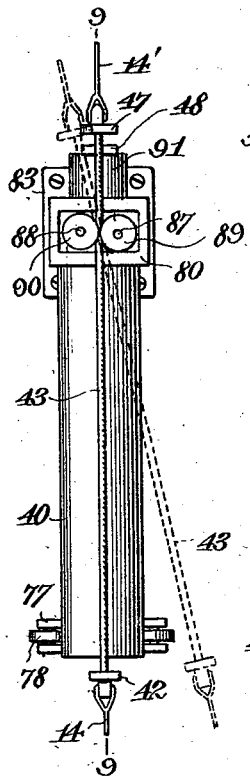
Figure 8 is a side view of the compensating mechanism shown in the upper part of Figure 1 but on an enlarged scale.

Referring to the accompanying drawings by numerals, 1 indicates the body of the ship to which is connected in any suitable manner a baseboard 2 in which the various uprights or posts 3, 4 and 5 are mounted. The post or upright 4 supports the fixed head or block 6 while the posts or uprights 3 and 5 support the actuator casing 7. Associated with this casing is a sleeve 8 through which the arms 9 and 10 extend and which guides said arms in their up and down movement. Links 11 and 12 are connected with these arms and also with the top cross bar 13 to which the wire or cable 14 is secured in any desired manner. It will be noted that when the frame formed of members 9 to 13, inclusive, is moved downwardly, the cable or wire 14 will be moved downwardly and when this frame is moved upwardly the wire or cable 14 will be released whereby it may move upwardly.

The parts are so arranged as hereinafter more fully described, that when the speed of the ship increases, the frame formed of the members 9 to 13 inclusive, will gradually move downwardly as the speed of the ship increases and, consequently, the cable or wire 14 will be pulled more and more and move certain mechanism which will cause the pointer 15 on the indicating device 16 to move proportionately for indicating the speed of the ship at all times.

As indicated in Figures 1 and 7, there is provided a Pitot tube 17 which has an arm 18 rigidly secured thereto in any desired manner, said arm being mounted in a position between the uprights 19 whereby it cannot turn, but must face forwardly at all times so that water may freely enter the mouth or opening 20 and pass upwardly at a pressure proportionate to the speed of the ship. It will be noted that the tube 17 passes through a valve 21 and through a fitting 22 associated therewith. It will also be noted that the valve 21 is larger than the tube and the fitting 22 is also larger than the tube so that water may pass through the entrance 23 upwardly through the valve 21 outside of the tube 17 and through the fitting 22 outside of the tube 17, said water passing thence through a pipe 24 to the bottom of the actuator casing 7. The Pitot tube 17 is connected to a flexible pipe or hose 25 which in turn is connected with a pipe 26, which latter pipe is connected with the casing 7 so as to discharge into the top thereof. It will thus be seen that water will enter by gravity through the opening 23 and pass into the lower part of the casing 7 and that water by gravity and also by reason of the pressure caused by the movement of the ship will enter the upper part of the casing 7 to urge the piston 27 downwardly. Suitable pet cocks are provided in the upper and lower ends of the casing 7 to permit the air to escape as the casing is filled with water. It will be noted that the device is filled completely with water when the device is operated. This is to prevent any inaction caused by expanding air.

The piston 27 is provided with a top plate and surrounding annular flange which is comparatively deep. A diaphragm 28 of rubber or other flexible material is mounted so as to lie flat against the top of the piston 27 and to lie against the annular flange of the piston. When the parts are in the upper position as shown in Figure 3, this diaphragm 28 is folded as at 29 and arranged so that its edge will be gripped at 30 between the outstanding flanges of the casing 7 where the parts of the casing 7 are bolted or riveted together. By reason of this arrangement of the piston and diaphragm, a very long movement is provided for the piston without the use of packing glands or similar devices.

As shown in Figure 3, the parts are in their furthest upper position with the pointer 15 at zero. In Figure 4, the parts are shown as having moved about half way down. This movement may continue until the flange of the piston strikes the lower part of the casing 7. As the piston moves downwardly, the water in the lower part of the casing 7 will be forced in a reverse direction out through the pipe 24 and thence back to the ocean. When the ship begins to slow down, the tension on the cable 14 caused by means herein fully described, will gradually move the piston back toward the position shown in Figure 3 and in doing so, expel some of the water in the upper part of the casing 7 and allow new water to enter the lower part.

In connection with the piston 27, it will be noted that there is a flexible tube or pipe 31 having an open end near the lower surface of the piston with the opposite end connected with the lower pet cock mounted on the casing whereby air may be freely discharged from the lower part of the casing. The piston 27 is also provided with a piston rod 32, which extends loosely through the bore 33, said bore being provided in an extension 34 of the casing, said extension being enlarged as at 35 to form an enlarged head. A diaphragm 36 is connected at one end to the plunger head 35 and at the other end to the tubular member 37. This tubular member 37 is preferably formed integral with the arms 9 and 10 and extends below said arms and has secured thereto one end of a diaphragm 38, the opposite end of which is secured to the block 6. By this arrangement, the diaphragms eliminate the necessity for packing glands and at the same time present a water-tight structure. It will be noted that the sleeve 8 forms a casing around the diaphragms 36 and 38 supporting said diaphragms from the outside as the pressure of water on the inside tends to force them outward against the casing 8.

By reason of the construction described, a body of water is maintained in the lower part of the casing 7 under static pressure opposed to the body of water in the upper part of the casing 7. The pressure of the water in the upper part of the casing 7 is the pressure provided by gravity produced by reason of the depth of the device and also by the pressure of the water in the Pitot tube by reason of the speed of the ship. This additional pressure is directly proportional to the speed of the ship and, consequently, increases and decreases as the speed varies.

In mounting the apparatus on a ship, it may be desirable to mount the indicator 16 at some distant point from the actuator, as for instance, on the bridge. Wire or cable of any kind extending from the actuator to the indicator will naturally stretch more or less. This slight stretch, however, will not affect the accuracy of the instrument nor the work of the actuator as the piston 27 has a very long movement and may readily take up the slack before moving the pointer 15. In fact, as herein described, means have been provided for causing a certain pull on the wire or cable 14 before the pointer is moved and when this certain pull is given, all of the slack is removed and any additional pull will simultaneously move the cable and pointer.

Figure 5:
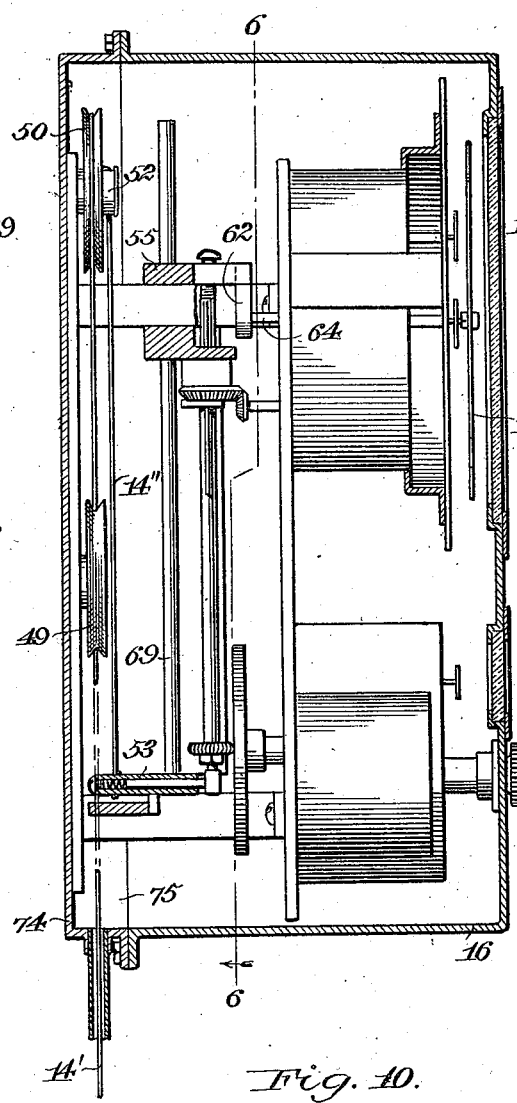
Figure 5 is a sectional view through Figure 1, approximately on line 5—5, the same being on an enlarged scale.
Figure 9:
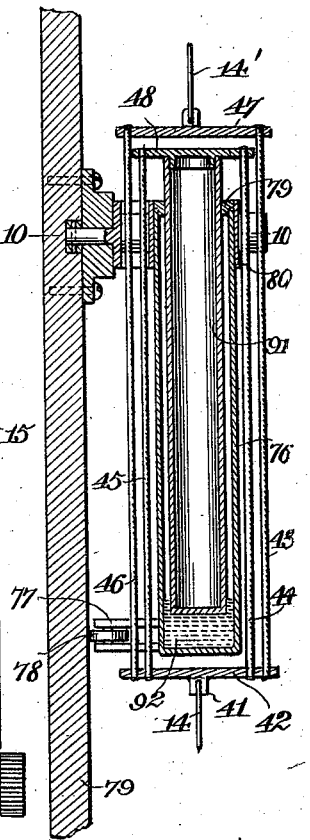
Figure 9 is a sectional view through Figure 8, approximately on line 9—9.
Figure 11:
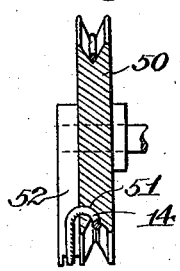
Figure 11 is a fragmentary horizontal sectional view through Figure 6, on line 10—10.

In Figures 1, 5 and 6, means have been shown for translating the reciprocating movement of the cable 14 into a rotary movement by the pointer 15. The cable 14 extends from bar 13 of the actuator to what may be termed a compensator 40 (Figures 8 and 9). The wire is connected to a suitable lug 41 rigidly secured to the plate 42, which plate has connected therewith flexible rods 43, 44, 45 and 46 which in turn are connected to the respective plates 47 and 48. The wire 14' is connected with the plate 47 and from there extends to the indicator 16 where it passes over an idler pulley 49 and from thence over pulley 50. At one point the cable 14' passes through an aperture 51 (Figure 11) and pulley 50 and onto the cam 52 from which it extends downwardly in a straight line so that it may be secured in a suitable manner at a central point to the plate 53. It will be noted that the use of the cam 52 converts the irregular speed curve of the ship into a regular lineal scale so that plate 55 will move a given distance per knot, regardless of how much the piston 27 of the actuator moves. In order to produce this result, the cam 52 is rigidly secured to or formed integral with the pulley wheel 50. The cam 52 is provided with a grooved portion arranged on a curve extending from the periphery of pulley 50 to near the center, said curve gradually reducing the distance to the center preferably in a direct ratio so that the pull on the cable will be from nearer and nearer the center as the ship increases its speed.

From Figures 5 and 6, it will be noted that connected with the top plate 55 in any suitable manner is a resilient metallic belt 62 with one end coiled around a drum 63 and secured thereto so that as the plate 45 moves upwardly, the drum 63 will rotate the shaft 64, which shaft is rigidly secured to the pointer 15 and supports said pointer. The belt 62 is in the nature of a cable and also a spring so that when the plate 55 moves upwardly, the belt 62 will unwind and rotate the drum 63 and shaft 64 and when the plate 55 moves downwardly, the belt will automatically re-wind and also move the shaft and pointer 15 back to their former position. It will, of course, be understood that the power necessary to move the pointer 15 is very small and, consequently, there is no strain on the various parts in carrying out this movement. The shaft 64 may be mounted in any suitable manner and in fact, is mounted in a construction shown in elevation in Figure 5 which forms no part of the present invention.

The plates 53 and 55 are rigidly secured in any desired manner to weights 65 and 66 which have a continuous tendency to move the parts downwardly to the position shown in Figure 6. Suitable rods 67 and 68 are riveted or otherwise rigidly secured to plates 53 and 55 to connect them together while the plates 53 and 55 are provided with apertures through which the guide rods 69 and 70 pass, said guide rods being rigidly secured to suitable brackets 71 and 72 secured in any desired manner to the back plate 73, which back plate is riveted or otherwise secured to the casing 74.

From Figure 5 it will be noted that this casing is made in two parts and divided along the line 75, said parts being secured together by screws or other desired means.

Figure 10:
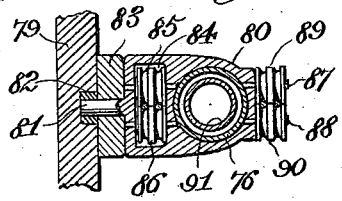
Figure 10 is a transverse sectional view through Figure 9, approximately on line 10—10.

In order to compensate for any possible errors caused by listing of the ship, the structure shown in Figures 8 and 9 is provided. This construction is formed with a tubular casing 76, the lower end of which is secured to a bracket structure 77 carrying anti-friction means 78 whereby it may freely move over the surface of the support 79 to which the device is secured. The upper end of the casing 76 is closed by a suitable closure 79 and is rigidly secured to an encircling member 80 which is secured in place in any desired manner and which is provided with a pivotal pin 81 (Figure 10) projecting into a washer 82 secured to pin 81. A journal bracket 83 is secured to the support 79 to present a journal surface for the pin 81. The encircling member 80 is provided with a cut-out portion 84 accommodating two sets of grooved pulleys 85 and 86 while pins 87 and 88 are connected with the member 80 and support two sets of pulleys 89 and 90. The flexible rods 44 and 45 pass between the inner pulleys 84 and 86 and also in the pulleys 89 and 90 while the flexible rods 43 and 44 pass between the outer pulleys. The plate 48 connected with the upper ends of the inner rods 44 and 45, is also rigidly secured to the plunger 91 which may be hollow as shown or may be solid, the same acting to displace the liquid 92 whenever moved downwardly. This liquid may be any suitable liquid, preferably mercury. It will, therefore, be noted that whenever the cable or wire 14 is pulled downwardly, the rods 44 and 45 will be moved downwardly and push or rather pull the plunger 91 downwardly, whereupon the proportioned amount of mercury 92 will be displaced and moved up alongside of the plunger. By reason of the difference of the specific gravity of the plunger and the mercury, there will be always a tendency of mercury to force the plunger upwardly, whereupon whenever the strain on the wire 14 is released, the parts will move back to their former position or as near their former position as possible. The arrangement of the parts as just described will permit the ship to list as indicated in dotted lines in Figure 8 while the compensator 40 remains in a substantially vertical position. This construction causes the mercury 92, plunger 91 and associated parts to function in the same manner regardless of the action of the ship and, consequently, to give an accurate reading of the speed of the ship at all times. The plunger 91 is intended to operate in a vertical position in order to co-act with the mercury which assumes the lowest point under the action of gravity. Where the ship is traveling on an even keel, the compensating device could be connected directly to any part of the ship and would operate properly. As the ship moves over the ocean it will roll and in many instances, it will list to one side and will travel on that side for a long distance. The rolling of the ship or the listing would put the compensating device at an angle and, consequently, the mercury and the plunger would not co-act in a desired manner because there would not be the proper depth of mercury at the right place. By pivotally mounting or swingably mounting the compensating device, the mercury is always at the bottom of its well and, consequently, the plunger co-acting therewith may always have the desired resistance.

In operation, when the parts are placed in the position shown in Figure 1 with valve 21 open, water will quickly flow into the lower part of the casing 7 and will fill the same provided the lower pet cock connected therewith is open. If this pet cock is not open it must be opened in order that the lower section of the casing may be filled with water and after this has been done, the lower pet cock is closed. The same action takes place in the upper part of the casing and the air must be let out through the upper pet cock. When both the lower and upper parts of the casing are filled with water under the action of gravity, the device will begin to function as soon as the ship begins to move. As the ship moves forward, water will be forced through the Pitot tube 17 in proportion to the speed of the ship and as said water passes upwardly through the pipes 25 and 26 into the upper part of casing 7, the piston 27 will be forced downwardly against the water in the lower part of the casing. This water must pass out through pipe 24 in the opposite direction through which it entered. This downward movement of the piston will continue as long as the speed of the ship increases and when the speed has reached a certain point and is maintained at that point, the parts will remain stationary, including pointer 15. As soon as the ship slacks speed or stops, the plunger 91 will pull the parts back gradually to the position shown in Figure 3 and expel the water in the upper part of the casing through pipes 25 and 26. As the water in the upper part of the casing is thus expelled, the water will automatically move into the lower part of the casing under the action of gravity until the parts assume the position shown in Figure 3. When the ship starts to move forwardly again, the above action is repeated. As the piston 27 moves downwardly, the same will pull the cable or wire 14 which in turn will pull the plate 42, rods 43, 44, 45 and 46, plate 48, plunger 91 and wire 14' and parts connected with wire 14'.

As heretofore described, the downward movement of plunger 91 will cause the mercury 92 to be displaced. The weights 65 and 66 assist the displacement of the mercury in moving the parts back to their former positions when the ship slows down or stops.

Preferably, the plunger 91 is normally somewhat submerged in the mercury 92 so that there is a continual strain on the wires or cables 14 and 14', which strain is augmented by the weights 65 and 66. In this way, the cable is maintained under tension so that as soon as water is forced into the upper part of the casing 7 of the actuator, the various parts will immediately respond for moving the pointer 15 the proper distance.

When the ship starts to move forwardly from a standstill, the pressure of the water entering the Pitot tube 17 will immediately increase so as to immediately act upon the piston 27. As the speed increases from nothing to say two knots, a certain pressure will be exerted on the piston 27. When the speed increases from two to three knots, an additional pressure will be applied and so on as the ship speeds up but the increase of pressure is not regular but increases at an increasing ratio, which if plotted as a curve, would produce what might be termed an irregular curve. This increasing ratio of pressure would cause the pointer 15 to move more than it should if direct connections were provided for translating the motion directly into rotary motion. In order to take care of this condition, the cam 52 is provided and the parts are so positioned that this cam will be horizontal when the ship is stationary. As the pressure increases, this cam will gradually move upwardly and as it moves will move the plate 55 and parts connected therewith so as to cause the shaft 64 to rotate. From Figure 6 it will be evident that the upward movement of plate 55 and associated parts will be less and less for each unit or distance of movement of the pulley 50 and the cable 14'. The extra pressure per knot as the ship increases in speed will cause a slight extra movement of the piston 27 and this extra movement will be compensated for by the position of the cam 52 as it moves from a horizontal to a vertical position.

What I claim is:

1. A ship's log, comprising an indicator, and means for causing the indicator to move in proportion to the speed of the ship, said means including an actuator constructed to move in proportion to the speed of the ship, and a compensating mechanism for compensating for the listing of the ship during its forward movement.

2. A ship's log, comprising an indicator and means for causing the indicator to move in proportion to the speed of the ship, said means including an actuator, a cable connecting the actuator and the indicator, and a compensating mechanism interposed in said cable, said compensating mechanism including a plunger acting as a float, and means for pivotally mounting the compensating mechanism on the ship so that the float may swing and thereby always remain in a substantially vertical position.

3. In a ship's log, an indicator provided with a dial, a pointer adapted to move over said dial, a reciprocating frame operatively connected with the dial so as to cause the pointer to move over the dial in proportion to the movement of the frame, a pulley arranged above said frame, a cam arranged along side of said pulley, said pulley having an aperture extending to the cam, a flexible member extending upwardly and over said pulley, said flexible member also extending through said aperture onto the cam and from thence down to said frame to which it is connected, and an actuator for moving the flexible member in one direction in proportion to the speed of the ship, the weight of said frame acting to move the same in the opposite direction.

4. In a ship's log, an indicator, an actuator, a flexible member connecting the indicator with the actuator and a compensating device interposed in said flexible member, said compensating device including a cylinder adapted to be supplied with a quantity of liquid, a plunger arranged in said cylinder, and means for connecting the top of the plunger with said flexible member so that it will be reciprocated simultaneously and at the same degree as the flexible member.

5. In a ship's log, an indicator, an actuator, a flexible member connecting the actuator with the indicator and a compensating device interposed in said flexible member, said compensating device including a swinging cylinder adapted to receive a quantity of liquid means for pivotally mounting said cylinder on a part of the ship, a plunger arranged in said cylinder, a plate arranged adjacent the lower end of said cylinder connected with said flexible member, a plate connected to the upper end of said plunger, flexible rods connecting said plates, an auxiliary plate arranged above the second mentioned plate, said auxiliary plate being connected with said flexible member, and flexible connecting rods connecting the first mentioned plate and the last mentioned plate whereby the plunger and cylinder will remain substantially vertical at all times notwithstanding the swinging movement of the flexible member caused by listing of the ship.

6. In a ship's log, a compensating device including an encircling member provided with a journal pin, means for receiving said journal pin and acting as a journal therefor whereby the encircling member may rotate with the pin, said encircling member being provided with a plurality of sets of pulley wheels, a cylinder rigidly secured to said encircling member, said cylinder being adapted to contain a supply of mercury, a plunger mounted in said cylinder, a plate connected to the upper end of the plunger, a plate arranged below said cylinder, a pair of flexible rods connected with said plates and extending between certain of said pulleys, an auxiliary plate arranged above the first mentioned plate, and a pair of flexible rods connecting the second mentioned plate and the auxiliary plate, said rods extending between certain of said pulleys whereby all of the rods are guided and the cylinder and plunger are maintained continually in a substantially vertical position with the pull thereon substantially in a vertical line.

RICHARD STAR.